United States Patent
Kobayashi

(10) Patent No.: US 9,487,454 B2
(45) Date of Patent: Nov. 8, 2016

(54) GAS GENERATING COMPOSITION

(75) Inventor: Syouji Kobayashi, Tatsuno (JP)

(73) Assignee: DIACEL CORPORATION, Osaka-Shi, Osaka (JP)

( * ) Notice: Subject to any disclaimer, the term of this patent is extended or adjusted under 35 U.S.C. 154(b) by 0 days.

(21) Appl. No.: 13/985,450

(22) PCT Filed: Mar. 22, 2012

(86) PCT No.: PCT/JP2012/057257
§ 371 (c)(1),
(2), (4) Date: Aug. 14, 2013

(87) PCT Pub. No.: WO2012/128302
PCT Pub. Date: Sep. 27, 2012

(65) Prior Publication Data
US 2013/0319586 A1   Dec. 5, 2013

(30) Foreign Application Priority Data

Mar. 23, 2011  (JP) .................. 2011-063872
Apr. 28, 2011  (JP) .................. 2011-100664

(51) Int. Cl.
| C06B 31/00 | (2006.01) |
| C06B 25/00 | (2006.01) |
| C06B 25/34 | (2006.01) |
| D03D 23/00 | (2006.01) |
| D03D 43/00 | (2006.01) |
| C06D 5/06  | (2006.01) |

(52) U.S. Cl.
CPC .............. C06B 25/00 (2013.01); C06D 5/06 (2013.01)

(58) Field of Classification Search
USPC ........... 149/88, 45, 92, 108.4, 109.4; 51/149
See application file for complete search history.

(56) References Cited

U.S. PATENT DOCUMENTS

| 2003/0024616 A1* | 2/2003 | Kim ................. C22C 45/10 148/561 |
| 2003/0024618 A1 | 2/2003 | Wu et al. |
| 2005/0189052 A1* | 9/2005 | Zeuner ................ C06D 5/06 149/45 |
| 2005/0263224 A1 | 12/2005 | Wu et al. |
| 2008/0149233 A1* | 6/2008 | Kobayashi .............. C06D 5/06 149/109.2 |
| 2010/0078098 A1 | 4/2010 | Wu et al. |
| 2012/0055593 A1 | 3/2012 | Kobayashi |

FOREIGN PATENT DOCUMENTS

| EP | 1 254 880 A1 | 11/2002 |
| EP | 2 444 383 A1 | 4/2012 |
| JP | 2001-220282 A | 8/2001 |
| JP | 2004-231446 A | 8/2004 |
| JP | 3907548 B2 | 4/2007 |
| JP | 2010-269969 A | 12/2010 |
| WO | WO 03/011798 A1 | 2/2002 |
| WO | WO 2010/134466 A1 | 11/2010 |

OTHER PUBLICATIONS

Extended European Search Report issued Oct. 6, 2014, in European Patent Application No. 12759896.9.
PCT/ISA/210—International Search Report mailed on May 15, 2012, issued in PCT/JP2012/057257.
PCT/ISA/237—mailed on May 15, 2012, issued in PCT/JP2012/057257.
International Preliminary Report on Patentability and Written Opinion issued Sep. 24, 2013, in PCT International Application No. PCT/JP2012/057257.
Japanese Office Action for Application No. 2011-100664 dated Jun. 2, 2015.

* cited by examiner

*Primary Examiner* — James McDonough
(74) *Attorney, Agent, or Firm* — Birch, Stewart, Kolasch & Birch, LLP

(57) ABSTRACT

Provided is a gas generating agent with a low combustion temperature and good ignition ability. The gas generating agent includes: (a) a fuel; (b) an oxidizing agent including a basic metal nitrate; (c) a basic metal carbonate; and (d) a binder (not including a component selected from starch, etherified starch, methyl cellulose, hydroxyethyl methyl cellulose, hydroxypropyl methyl cellulose, hydroxyethyl cellulose, guar gum, etherified guar gum, tamarind gum, poly(vinyl alcohol), polyvinyl ether, polyacrylamide, polyethylene oxide, and polyvinyl pyrrolidone). The fuel of the component (a) includes melamine cyanurate (MC) and nitroguanidine (NQ), with MC/NQ (ratio of contents) of being within a range of 0.20 to 1.50.

4 Claims, No Drawings

GAS GENERATING COMPOSITION

TECHNICAL FIELD

The present invention relates to a gas generating composition that has a low combustion temperature and excellent ignition ability.

BACKGROUND ART

When a gas generating agent is used in an inflator for use in a safety apparatus for a vehicle such as a airbag apparatus disposed in a vehicle, it is very important to improve ignition ability of the gas generating agent in order to ensure product reliability.

And, it is important to decrease the combustion temperature of the gas generating agent because the heat load on the coolant disposed in the inflator can be reduced and an amount of a coolant can be decreased.

However, where the combustion temperature of the gas generating agent is decreased too much, the ignition ability is degraded. Therefore, it is desirable to decrease the combustion temperature and obtain excellent ignition ability at the same time.

A stable force to deploy a bag is required in inflators for airbag apparatuses, but a burning rate of a gas generating agent which burns inside an inflator is known to change in a range of a power of the pressure index n according to the following formula under the effect of pressure change inside the inflator:

$$r = aP^n$$

(where r is a burning rate, a is a constant (a value inherent to the gas generating composition), P is a pressure inside the inflator, and n is a pressure index (a value inherent to the gas generating composition)).

Where a gas generating agent has a large index n, a burning rate of the gas generating agent changes significantly because of pressure change inside the inflator, thereby also causing a significant change in an amount of gas generated by the combustion of the gas generating agent.

In such a case, the deployment force of an air bag changes due to pressure change inside the inflator and the air bag fails to act as a protection device.

Therefore, it is important to provide a gas generating agent with a small index n and provide a gas generating agent having combustion stability that is not affected significantly by changes in an environment, such as temperature and pressure.

JP-B No. 3907548 discloses a gas generating composition for an inflator including: (a) melamine cyanurate or a mixture of melamine cyanurate and a nitrogen-containing organic compound as a fuel, and (b) an oxygen-containing oxidizing agent, which can exhibit a specific effect such as a low combustion temperature and a small amount of generated hazardous gas, as a result of using novel melamine cyanurate as a fuel component.

It is described that the compounding ratio (mass ratio), nitrogen-containing organic compound/melamine cyanurate, in the mixture of melamine cyanurate and nitrogen-containing organic compound, is preferably 0.05 to 8, more preferably 0.1 to 6, and even more preferably 0.2 to 2.

Decreasing combustion temperature is described as a problem to be solved, but improving ignition ability is not a problem to be solved, and it is only described that the ignition ability is improved by selecting an appropriate binder.

And the value of the pressure index is given as 0.23 in Example 28 and 0.31 in Example 29 in Table 4.

SUMMARY OF THE INVENTION

The present invention provides a gas generating composition containing:

(a) a fuel;
(b) an oxidizing agent including a basic metal nitrate;
(c) a basic metal carbonate; and
(d) a binder (not including a component selected from starch, etherified starch, methyl cellulose, hydroxyethyl methyl cellulose, hydroxypropyl methyl cellulose, hydroxyethyl cellulose, guar gum, etherified guar gum, tamarind gum, poly(vinyl alcohol), polyvinyl ether, polyacrylamide, polyethylene oxide, and polyvinyl pyrrolidone), the fuel of the component (a) including melamine cyanurate (MC) and nitroguanidine (NQ), with a ratio (MC/NQ) of contents of MC and NQ being within a range of 0.20 to 1.50;

the content of the component (b) being larger than the content of the component (c), a ratio of the content of the component (b)/the content of the component (c) being equal to or greater than 1.00.

DETAILED DESCRIPTION OF THE INVENTION

The present invention is to provide a gas generating composition with a low combustion temperature, good ignition ability, and particularly a small amount of carbon monoxide in released gas.

The present inventors conducted a research aimed at the improvement of the invention disclosed in JP-B No. 3907548. The results obtained demonstrates that the above-described problems can be resolved and a pressure index can be further greatly reduced by:

1. combining nitroguanidine with melamine cyanurate, which has not been specifically described in JP-B No. 3907548, at a specific ratio; and 2. combining an oxidizing agent including a basic metal nitrate with a basic metal carbonate, which has not been specifically described in JP-B No. 3907548, at a specific ratio.

This finding led to the present invention.

The gas generating composition in accordance with the present invention has a low combustion temperature and good ignition ability. Further, the gas generating composition in accordance with the present invention provides less amount of hazardous gas such as carbon monoxide in gas generated by combustion and a smaller pressure index.

<(a) Fuel>

The fuel of the component (a) used in accordance with the present invention includes melamine cyanurate and nitroguanidine, and may include only melamine cyanurate and nitroguanidine or these two components and additionally also a known other fuel within a range in which the present invention can be obtained.

A example of a known other fuel includes one, two, or more selected from tetrazole compounds such as 5-aminotetrazole and bitetrazole ammonium salt, guanidine compounds such as guanidine nitrate and dicyandiamide (nitroguanidine is excluded), and triazine compounds such as melamine, trimethylol melamine, alkylated methylol melamine, ammeline, ammelande, melamine nitrate, melamine perchlorate, trihydrazinotriazine and a nitrocompound of melamine.

When a known other fuel is included in addition to the melamine cyanurate and nitroguanidine, a content of the other fuel in the fuel of the component (a) is equal to or less than 5% by mass.

<(b) Oxidizing Agent>

The oxidizing agent of the component (b) used in accordance with the present invention includes a basic metal nitrate and, as necessary, another oxidizing agent. By using the basic metal nitrate as the component (b), the combustion temperature is lowered.

The basic metal nitrate can be one or two or more selected from basic copper nitrate, basic cobalt nitrate, basic zinc nitrate, and basic manganese nitrate. Among them, basic copper nitrate is preferred.

A example of another oxidizing agent includes metal nitrates, ammonium nitrate, metal perchlorates, ammonium perchlorate, metal nitrites, and metal chlorates.

<(c) Basic Metal Carbonate>

The basic metal carbonate of the component (c) used in accordance with the present invention is basic zinc carbonate, basic copper carbonate, or a combination thereof. By using the component (c), the combustion temperature is lowered.

<(d) Binder>

The binder of the component (d) used in accordance with the present invention is one or two or more selected from carboxymethyl cellulose (CMC), carboxymethyl cellulose sodium salt (CMCNa), carboxymethyl cellulose potassium salt, carboxymethyl cellulose ammonium salt, cellulose acetate, cellulose acetate butyrate (CAB), ethyl cellulose (EC), hydroxyethyl cellulose (HEC), microcrystalline cellulose, polyacrylhydrazide, acrylamide-acrylic acid metal salt copolymers, polyacrylamide-polyacrylic acid ester compound copolymers, acrylic rubber, and silicone. Among them, CMCNa is preferred.

Note that the binder of the component (d) of the present invention does not include one selected from starch, etherified starch, methyl cellulose, hydroxyethyl methyl cellulose, hydroxypropyl cellulose, hydroxypropyl methyl cellulose, hydroxyethyl cellulose, guar gum, etherified guar gum, tamarind gum, poly(vinyl alcohol), polyvinyl ether, polyacrylamide, polyethylene oxide, and polyvinyl pyrrolidone.

<Other Components>

The gas generating composition in accordance with the present invention may also include various known additives in order to adjust the burning rate of the gas generating composition and purify combustion gas, within the range in which the present invention is obtained.

A example of a known additive include metal oxides such as cupric oxide, iron oxide, zinc oxide, cobalt oxide, manganese oxide, molybdenum oxide, nickel oxide, bismuth oxide, silica, and alumina; metal hydroxides such as aluminum hydroxide, magnesium hydroxide, cobalt hydroxide, and iron hydroxide; cobalt carbonate, calcium carbonate; composite compounds of metal oxides or hydroxides such as Japanese acid clay, kaolin, talc, bentonite, diatomaceous earth, and hydrotalcite; metal salts such as sodium silicate, mica molybdate, cobalt molybdate, and ammonium molybdate; molybdenum disulfide, calcium stearate, silicon nitride, silicon carbide, metaboric acid, boric acid, and anhydrous boric acid.

In the gas generating composition in accordance with the present invention, a ratio (MC/NQ) of the contents of the melamine cyanurate (MC) and nitroguanidine (NQ) in the fuel of the component (a) is 0.20 to 1.50.

In the gas generating composition in accordance with the present invention, a content of the component (b) is preferably greater than the content of the component (c), and the ratio ((b)/(c)) of the content of the component (b) to the content of the component (c) is preferably equal to or greater than 1.00.

In the gas generating composition in accordance with the present invention, a ratio of the components is adjusted according to a targeted ignition ability at a low temperature, a targeted purification degree of released gas, and a targeted pressure index for the purpose.

In order to enhance an ignition ability at a low temperature, the MC/NQ ratio is preferably equal to or greater than 0.20, more preferably 0.30 to 1.00, even more preferably 0.6 to 0.95.

In order to enhance the ignition ability at a low temperature, a (b)/(c) ratio is preferably equal to or greater than 1.00, more preferably 1.50 to 15.00, even more preferably 5.50 to 13.00.

In order to reduce the concentration of carbon monoxide in released gas and decrease the pressure index, a MC/NQ ratio is preferably equal to or less than 0.50, more preferably 0.50 to 0.20.

In order to enhance the ignition ability at a low temperature, reduce the concentration of carbon monoxide in released gas and decrease the pressure index, a MC/NQ ratio is 0.70 to 0.90 and a (b)/(c) ratio is 4.00 to 8.00.

The contents of the components (a) to (d) in the gas generating composition in accordance with the present invention are described below:

The content of the fuel of the component (a) is preferably 20 to 50% by mass, more preferably 25 to 40% by mass;

The content of the oxidizing agent of the component (b) is preferably 30 to 75% by mass, more preferably 40 to 70% by mass;

The content of the basic metal carbonate of the component (c) is preferably 3 to 30% by mass, more preferably 3 to 15% by mass; and The content of the binder of the component (d) is preferably 2 to 10% by mass, more preferably 2 to 8% by mass.

By adjusting the above-described components in the gas generating composition in accordance with the present invention, the pressure index (n) is set to be a value equal to or less than 0.20, preferably equal to or less than 0.15.

The gas generating composition in accordance with the present invention can be molded into a desired shape, and a single-perforated cylindrical molded article, a perforated cylindrical molded article, or a pellet-shaped molded article can be obtained. These molded articles can be manufactured by a method in which water or an organic solvent is added to and mixed with the gas generating composition and the obtained mixture is extrusion-molded (into a single-perforated cylindrical molded article or a perforated cylindrical molded article), or by a compression-molding method using a pelletizer or the like (for a pellet-shaped molded article).

The gas generating composition in accordance with the present invention or a molded article obtained therefrom can be used for, for example, an airbag inflator for a driver's side, an airbag inflator for a passenger side next to the driver, a side airbag inflator, an inflator for an inflatable curtain, an inflator for a knee bolster, an inflator for an inflatable seat belt, an inflator for a tubular system, and an inflator for a pretensioner, of various vehicles.

An inflator, that uses the gas generating composition in accordance with the present invention or a molded article obtained therefrom, may be of a pyrotechnic type in which a gas supply source is only a gas generating agent or of a hybrid type that uses both compressed gas, such as argon, and a gas generating agent.

Furthermore, the gas generating composition of the present invention or a molded article obtained therefrom can be also used as an igniting agent called an enhancer (or a booster), which serves to transmit an energy of a detonator or a squib to the gas generating agent.

EXAMPLES

The present invention is explained herein-below by Examples. However, the present invention is not limited to these Examples.

Examples and Comparative Examples

Gas generating compositions including components shown in Table 1 were manufactured. The properties shown in Table 1 were measured for those compositions. The results are shown in Table 1.

(1) Combustion Temperature

Combustion temperature based on theoretical calculations.

(2) Burning Rate

<Method for Preparing Cylindrical Strand>

Water was added to and mixed with the compositions of Examples and Comparative examples, and the mixtures were extrusion-molded, cut, and dried to obtain single-perforated molded articles.

The obtained single-perforated molded article was pulverized in an agate mortar, and a powder that has passed through a wire mesh with a mesh size of 500 µl was loaded to a receiving die of a predetermined die.

A cylindrical strand with an outer diameter of 9.55 mm and a length of 12.70 mm was then molded by compressing for 5 seconds under a pressure of 14.7 MPa applied by a hydraulic pump from the pestle-side end surface and then removing from the die.

An epoxy resin chemical-reaction-type adhesive "Bond Quick 30" manufactured by Konishi Co., Ltd. was applied to the side surface of the cylindrical strand and then thermally cured for 16 hours at 110° C., so as to obtain a sample which could be ignited and burned only from the end surface and could not be ignited from the side surface (unifacial propagating combustion).

<Method for Measuring Combustion Rate>

The cylindrical strand serving as a sample was installed in an SUS sealed bomb with an internal volume of 1 liter and pressurized to and stabilized at 6860 kPa, while the inside of the bomb was purged with nitrogen.

Then, a predetermined electric current was passed through a nichrome wire that was brought into contact with the end surface of the strand and the strand was ignited and burned by the fusion energy of the nichrome wire.

The behavior of pressure inside the bomb with time was verified by a recorder chart, a period of time from the start of the combustion until the peak of pressure rise was verified from the scale of the chart, and the numerical value that was obtained by dividing the length of the strand prior to combustion by the above period of time was taken as the burning rate.

The tests with pressurization and stabilization of 4900 kPa and 8820 kPa were performed in the same manner as described above.

(3) Pressure Index

The burning rate was measured under a nitrogen atmosphere and a pressure of 4900 kPa, 6860 kPa, and 8820 kPa by using the cylindrical strands manufactured by the above-described method.

In the Examples, a burning rate under 6860 kPa and a pressure index within a range of 4900 kPa to 8820 kPa are shown.

(4) Ignition Ability

The single-perforated molded article (with an outer diameter of about 4 mm, an inner diameter of about 1 mm, a length of about 4 mm) obtained by extrusion-molding was loaded into a combustion chamber of a gas generator (provided inside thereof with the combustion chamber with a volume of 31 cm$^3$; the total surface area of a plurality of gas discharge openings provided in the outer housing is 79.8 mm$^2$) for the evaluation test. The amount of the molded article was such that no unnecessary gap appeared in the combustion chamber and also such that the single-perforated molded article located inside the combustion chamber was not cracked when the gas generator was sealed. The amount of the single-perforated molded article used for the measurements is shown in Table 1.

The gas generator for the evaluation test had ignition device provided with an igniter including 55 mg of ZPP, and 4.5 g of a transfer charge including nitroguanidine, strontium nitrate, carboxymethyl cellulose strontium salt, and Japanese acid clay.

The gas generator for the evaluation test was disposed in a 60-liter tank (−40° C.) equipped with a sensor for pressure measurements. The combustion test was conducted by actuating the gas generator.

The actuation start time of the ignition device was taken as 0, and the ignition ability was evaluated by the time that had elapsed since the actuation start time and the value of pressure inside the 60-liter tank at the elapsed time.

Where the pressure at 10 milliseconds was equal to or greater than 80 kPa, the ignition ability was determined to be very good (⊚). Where the pressure at 10 milliseconds was 50 kPa to less than 80 kPa, the ignition ability was determined to be good (○), and where the pressure at 10 milliseconds was less than 50 kPa, the ignition ability was determined to be poor (X).

(5) Method for Measuring Gas Concentration

The measurements were conducted using a single-perforated agent obtained in the same manner as in (2) Burning rate <Method for Preparing Cylindrical Strand> and a gas generator for an evaluation test of the same specifications as that of (4) Ignition ability.

The gas generator for an evaluation test provided with the ignition device (an igniter including 55 mg of ZPP, and 4.5 g of a transfer charge including nitroguanidine, strontium nitrate, carboxymethyl cellulose strontium salt, and Japanese acid clay) was disposed in a tank having an inner volume of 2800 liters and pressurized to and stabilized at 7 MPa, while the inside of the bomb was entirely purged with nitrogen.

In this state, combustion was conducted at a normal temperature (23° C.), the combustion gas discharged into the tank was introduced into an FTIR (VIR-9500, manufactured by JASCO Corporation), and the concentrations of $NO_2$, NO, CO, and $NH_3$ were measured. The value of concentration in each case was obtained by averaging the values obtained in 3 minutes, 15 minutes, and 30 minutes after the combustion.

TABLE 1

| | Gas generating composition | | | | | Ratio | | Combustion temp. | Burning rate | Pressure index | Ignitionability | | Released gas (2800 L) ppm | | | |
|---|---|---|---|---|---|---|---|---|---|---|---|---|---|---|---|---|
| | Contents (% by mass) | | | | | | | | | | | Amount used | (23° C.) | | | |
| | (a) | (a) | (b) | (c) | (d) | MC/ | BCN/ | | (mm/s) | | Low temp. | | | | | |
| | MC | NQ | BCN | BCC | CMCNa | NQ | BCC | K | 7 MPa | n | (−40° C.) | (g) | NO₂ | NO | CO | NH₃ |
| Example 1 | 13.43 | 14.50 | 62.07 | 5.00 | 5.00 | 0.93 | 12.41 | 1548 | 19.5 | 0.13 | ⊚ | 33.5 | 0 | 10 | 114 | 7 |
| Example 2 | 12.18 | 18.50 | 59.32 | 5.00 | 5.00 | 0.66 | 11.86 | 1583 | 19.2 | 0.15 | ⊚ | 33.9 | 0 | 4 | 142 | 34 |
| Example 3 | 12.23 | 14.50 | 58.27 | 10.00 | 5.00 | 0.84 | 5.83 | 1530 | 19.4 | 0.10 | ⊚ | 33.3 | 0 | 25 | 94 | 3 |
| Example 4 | 8.50 | 19.00 | 47.50 | 20.00 | 5.00 | 0.45 | 2.38 | 1531 | 19.7 | 0.10 | ⊚ | 34.2 | 0 | 15 | 87 | 10 |
| Example 5 | 6.75 | 21.00 | 42.25 | 25.00 | 5.00 | 0.32 | 1.69 | 1526 | 20.6 | 0.10 | ⊚ | 35.3 | 0 | 9 | 82 | 14 |
| Example 6 | 5.00 | 23.00 | 37.00 | 30.00 | 5.00 | 0.22 | 1.23 | 1520 | 20.4 | 0.09 | ○ | 34.3 | 0 | 9 | 80 | 15 |
| Example 7 | 15.66 | 10.8 | 65.54 | 3.00 | 5.00 | 1.45 | 21.85 | 1485 | 19.2 | 0.15 | ○ | 33.9 | 0 | 21 | 164 | 6 |
| Comparative Example 1 | 13.92 | 16.50 | 64.58 | — | 5.00 | 0.84 | — | 1588 | 16.1 | 0.20 | ○ | 35.0 | 0 | 14 | 362 | 30 |
| Comparative Example 2 | 3.00 | 23.00 | 24.00 | 45.00 | 5.00 | 0.13 | 0.53 | 1365 | 9.8 | 0.10 | X | 35.4 | — | — | — | — |
| Comparative Example 3 | — | 26.12 | 13.88 | 55.00 | 5.00 | — | 0.25 | 1358 | 9.5 | 0.13 | X | 35.8 | — | — | — | — |
| Comparative Example 4 | 1.03 | 28.00 | 25.97 | 40.00 | 5.00 | 0.04 | 0.65 | 1532 | 18.2 | 0.11 | X | 35.2 | — | — | — | — |
| Comparative Example 5 | 19.23 | 1.28 | 64.49 | 10.00 | 5.00 | 15.02 | 6.45 | 1286 | 8.6 | 0.11 | X | 36.1 | — | — | — | — |
| Comparative Example 6 | 3.16 | 31.63 | 50.20 | 10.00 | 5.00 | 0.10 | 5.02 | 1869 | — | — | — | 33.1 | — | — | — | — |

MC: Melamine cyanurate
NQ: Nitroguanidine
GN: Guanidine nitrate
BCN: Basic copper nitrate
BCC: Basic copper carbonate
CMCNa: Carboxymethyl cellulose sodium salt The compositions of Comparative Examples 2 and 4 to 6 included MC and NQ as the component (a), but the MC/NQ ratio was outside the range of 0.20 to 0.95. Therefore, the ignition ability was poor (evaluation: X) and the combustion temperature increased dramatically.

The ignition ability of the composition of Comparative Example 1 was good (evaluation: ○), but the pressure index was higher than that in Examples and the amount of generated carbon monoxide and ammonia was very high.

The compositions of Examples demonstrated a low combustion temperature, a good ignition ability (with evaluation: ⊚ or ○), and, in comparison with the results in Comparative Example 1, smaller amounts of generated carbon monoxide and ammonia in the combustion gas (released gas).

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generating composition comprising:
   (a) a fuel;
   (b) an oxidizing agent including a basic metal nitrate;
   (c) a basic metal carbonate selected from the group consisting of a basic zinc carbonate, a basic copper carbonate, and a combination thereof; and
   (d) a binder, not including starch, etherified starch, methyl cellulose, hydroxyethyl methyl cellulose, hydroxypropyl methyl cellulose, hydroxyethyl cellulose, guar gum, etherified guar gum, tamarind gum, poly(vinyl alcohol), polyvinyl ether, polyacrylamide, polyethylene oxide, and polyvinyl pyrrolidone,
   the fuel of the component (a) including melamine cyanurate (MC) and nitroguanidine (NQ), with a ratio (MC/NQ) of contents of MC and NQ being within a range of 0.30 to 0.95;
   a ratio of the content of the component (b) to the content of the component (c) is 1.50 to 15.00.

2. The gas generating composition according to claim 1, wherein
   the content of the fuel of the component (a) is 20 to 50% by mass;
   the content of the oxidizing agent of the component (b) is 30 to 75% by mass;
   the content of the basic metal carbonate of the component (c) is 3 to 30% by mass; and
   the content of the binder of the component (d) is 2 to 10% by mass.

3. The gas generating composition according to claim 1, wherein the binder of the component (d) is a sodium salt of carboxymethyl cellulose.

4. The gas generating composition according to claim 2, wherein the content of the binder of the component (d) is 2 to 8% by mass.

* * * * *